(12) United States Patent
Shackle

(10) Patent No.: US 6,174,623 B1
(45) Date of Patent: Jan. 16, 2001

(54) CONDUCTIVE-POLYMER-COATED ELECTRODE PARTICLES

(75) Inventor: Dale R. Shackle, Morgan Hills, CA (US)

(73) Assignee: Valence Technology, Inc., Henderson, NV (US)

( * ) Notice: Under 35 U.S.C. 154(b), the term of this patent shall be extended for 0 days.

(21) Appl. No.: 08/207,990

(22) Filed: Mar. 8, 1994

(51) Int. Cl.⁷ ....................................... H01M 4/58
(52) U.S. Cl. ................. 429/218.1; 429/224; 429/231.3; 429/231.5
(58) Field of Search ................... 429/212–215, 429/217, 218, 223, 224, 235, 236, 218.1

(56) References Cited

U.S. PATENT DOCUMENTS

| | | | |
|---|---|---|---|
| 4,668,596 | * | 5/1987 | Shacklette et al. ............... 429/194 |
| 4,804,594 | * | 2/1989 | Jow et al. ........................... 429/194 |
| 5,011,501 | * | 4/1991 | Shackle et al. .................... 29/623.1 |
| 5,256,730 | * | 10/1993 | Gan et al. ........................... 524/800 |

\* cited by examiner

Primary Examiner—Maria Nuzzolillo
(74) Attorney, Agent, or Firm—Young & Basile, P.C.

(57) ABSTRACT

An electro-active compound particulate coated with a conducting polymer composition finds use in electrochemical cell electrodes.

20 Claims, 2 Drawing Sheets

CONDUCTIVE-POLYMER-COATED ELECTRODE PARTICLES

FIELD OF THE INVENTION

The present invention is concerned with electrode improvements which find use in solid or liquid electrochemical cells, and in general, wherever intercalation compounds have heretofore been used in composite electrodes with an electronically conducting material such as carbon.

BACKGROUND OF THE INVENTION

Solid secondary electrochemical cells consist of a solid electrolyte interposed between an anode and a cathode. Preferably, the solid electrolyte is a single-phase material consisting of a solid polymeric matrix, an inorganic ion salt, and an electrolyte solvent. Preferably, the cathode is a composite material composed of an intercalation compound, carbon, solvents and a solid polymeric matrix. The anode may be composed of metals or of an intercalating material. For many advantageous reasons, interest centers on lithium-based electrochemical cells and intercalating cathodes.

Solid electrochemical cells offer a number of advantages over electrochemical cells containing a liquid electrolyte, including light-weight and high-energy density. Solid electrolytes are prepared in thin layers which reduce cell resistance and allow large drains at low-current density. The solid electrolyte is usually composed of a polymeric matrix, a suitable salt and an electrolyte solvent which aids conductivity and acts as a plasticizer for the polymer. The polymerization is normally carried out in a curing step performed on a composition, including a polymer precursor, or prepolymer, which undergoes radiation or heat-induced cross-linking reactions to form the polymeric matrix. Suitable polymer precursors include, for example, poly (oxyalkylene) ethers, such as polyethylene oxide, and acryloyl-derivatized poly(oxyalkylene) ethers.

The solid electrolyte also contains a solvent chosen for lower volatility and excellent capability with the other components of the electrolyte as evidenced by conductivity, charge capacity and life-time of the cell. Suitable solvents well-known in the art for use in solid electrolytes including, by way of example, organic carbonates and glymes.

In a preferred method of manufacturing a solid electrochemical cell, the solid electrolyte is cured on the surface of a cathode. Typically, the cathode is itself prepared by coating a mixture of cathode-active material, the electroconductive such as carbon, a solid matrix forming polymer precursor, and an electrolyte solvent on a current collector followed by curing with an electron beam. If the solid electrolyte is then formed on this cathode surface, an anode material can then be laminated on to the solid electrolyte to form a solid electrochemical cell.

It has been suggested that a conductive polymer may be used to replace carbon as the conductive material in composite electrodes, particularly, composite cathodes. While the art recognizes that dopants in one form or another are a necessary compliment to non-ionic organic materials in order to function as efficient conductors, and that a means must be found to efficiently incorporate the conducting polymer and dopant into the composite electrode, means of satisfactorily accomplishing this end have been lacking.

Many conducting polymers are difficult to work with and some are simply intractable high molecular weight materials, insoluble in ordinary solvents and prone to decomposition below their melting or softening point.

Co-pending U.S. patent application Ser. No. 08/163,209, filed Dec. 6, 1993, the disclosure of which is incorporated herein in its entirety, disclosed the replacement of carbon as the conductive component of the cathode in an electrochemical cell. The goal of replacing carbon with conducting polymer was to improve the conductivity, in particular, the electronic conductivity of the cathode with a lightweight substitute material.

It was suggested that compatible cathode-active materials, i.e., intercalation compounds, be mixed with electronically conducting polymer, and a binder, such as a polymeric binder, to form a positive cathode plate under pressure. Suitable cathode-active materials included vanadium oxides, and suitable conductive polymers included polyaniline.

Electrodes made of a major amount of conducting polymer have been developed for solid electrochemical cells, i.e., Fiona M. Gray, "Solid Polymer Electrolytes", VCH Publishers, Inc., New York, 1991, pp. 5–9; U.S. Pat. Nos. 4,222,903; 4,519,939; 4,519,940; and 4,579,679, the disclosures of each of which is incorporated herein in its entirety.

It would be advantageous if the method of making composite electrodes of cathode-active material and conducting polymers could be improved. In particular, the art is searching for methods of handling polymeric conductors more efficiently to produce a more conductive, less resistive, lower impedance cathode of high charge capacity and cyclability.

SUMMARY OF THE INVENTION

Electrodes finding use in solid electrochemical cells are made by forming an electrode paste composed of a solid matrix forming polymer precursor, a compatible electrolyte solvent, and an electro-active material coated with a conducting polymer; coating the paste onto a substrate; and curing the paste to a solid electrode. Preferably, the electrode is a cathode and the cathode-active material is an intercalation compound.

The cathode-active material is a particulate which in another aspect of this invention, is coated by solubilizing a conductive polymer composition with a solvent; mixing the solubilized conductive polymer composition with particles of cathode-active material to form a mixture; and removing substantially all the solvent from the mixture to produce a particulate product of cathode-active material coated with a conducting polymer composition.

Another aspect of this invention is an electrode, preferably a cathode, which contains particles of an electro-active material coated with a conducting polymer composition. Such a conducting polymer composition may include any compatible conductive polymer, and preferably a polymer composition selected from the group consisting of polyaniline, polyacetylene, polyquinoline, polyquinoxaline, poly(p-phenylene sulfite), poly(phenylquinoxaline), (poly (p-phenylene), polypyrrole, and polyphthalocyaninesiloxane. More preferably, the conducting polymer composition is composed of a major amount of polyaniline and a dopant.

In yet another aspect of the invention, the dopant is selected to provide solubility to the polymer as well as to render the polymer conducting. Preferably, the conducting polymer composition is a protonated polymer salt, for example, a protonated polyaniline salt, wherein the salt contains a counter-ion comprising a functional group which assists solubility. Such conducting protonated polymer salts are soluble in ordinary solvents such as pyrrolidine, tripropylene, tripropylamine, xylene, chloromethane, m-cresol, formic acid and dimethylsulfoxide.

In yet another aspect of the invention, the components of the manufacturing process consist of a mixture composed of a cathode-active material in particulate form, a solubilized conducting polymer and a solvent for the conducting polymer; and a cathode paste composed of a solid polymer matrix-forming polymer precursor, a particulate composed of cathode-active material particles coated with a conducting polymer composition, and a compatible electrolyte solvent.

In yet another aspect of the invention, an electrochemical cell contains an anode composed of compatible anodic materials, a cathode composed of compatible cathodic materials, and a solid electrolyte interposed therebetween; wherein the solid electrolyte comprises a solid polymer matrix, an inorganic ion salt, and an electrolyte solvent; and wherein the cathode comprises particles of a cathode-active material coated with a conducting polymer composition. A secondary battery comprises at least two such cells.

DETAILED DESCRIPTION OF PREFERRED EMBODIMENTS ON THE INVENTION

Figure 1:
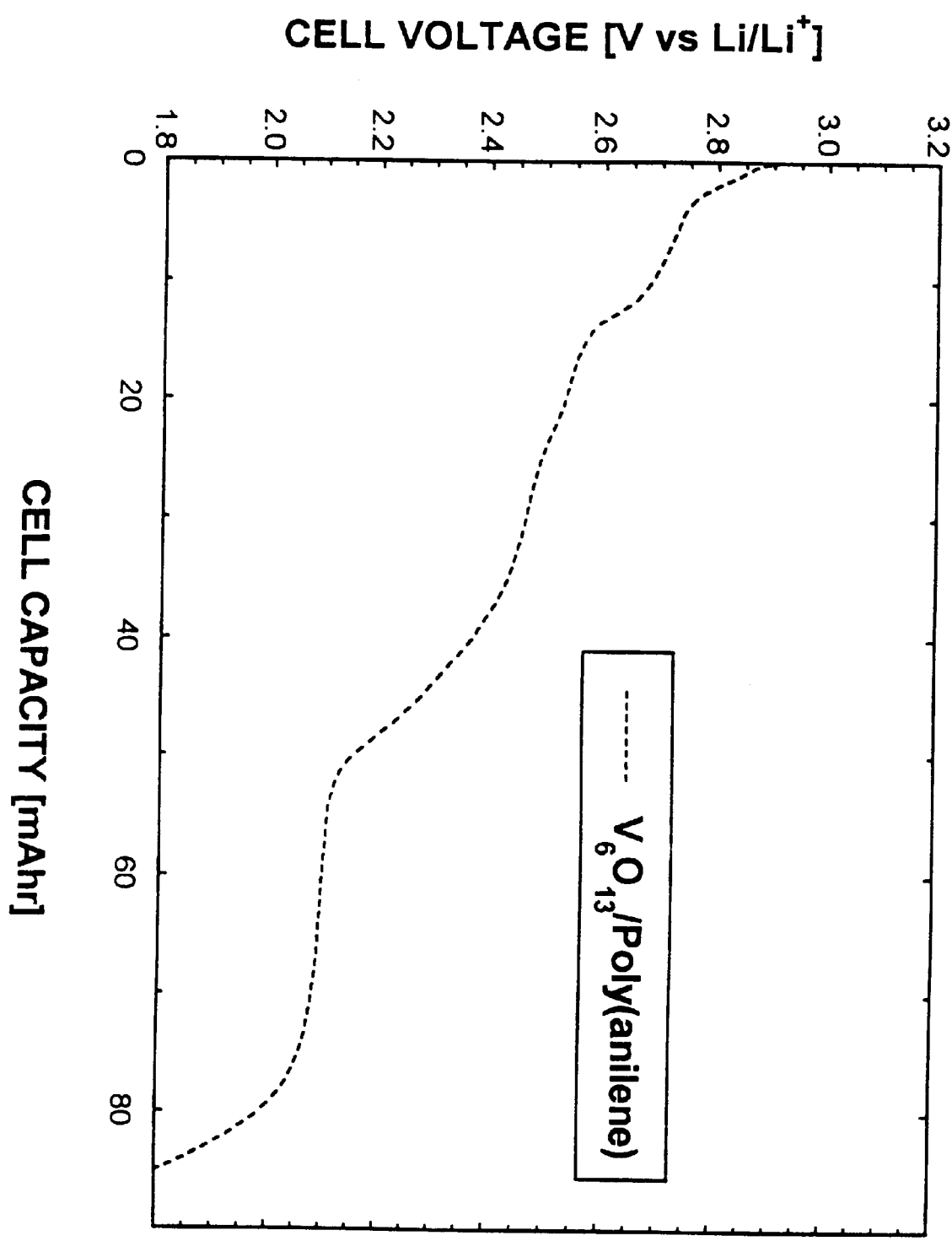
FIG. 1 shows the charge capacity of an electrochemical cell of the present invention measured in milliampere hours, as the cell is discharged, and the concurrent decrease in cell voltage.

The invention is concerned with electrodes and their method of making. Particularly of interest, are cathodes containing a cathode-active particulate material coated with a conducting polymer, and solid electrochemical cells made therefrom.

However, prior to describing this invention in further detail, the following terms are defined below.

Definitions

As used herein, the following terms have the following meanings.

The term "solid polymeric matrix" refers to an electrolyte compatible material formed by polymerizing an inorganic or organic monomer (or partial polymer thereof) and which, when used in combination with the other components of the electrolyte, renders the electrolyte solid. The solid matrix may or may not be ion-conducting.

Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. Preferably, the solid matrix forming monomers have at least one heteroatom capable of forming donor acceptor bonds with inorganic cations (e.g., alkali ions). When polymerized, such compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. patent application Ser. No. 07/918,438, filed Jul. 22, 1992, and entitled "SOLID ELECTROLYTES DERIVED BY POLYMERIZATION OF VINYL SULFONATE POLYALKYLENE OXIDES" which application is incorporated herein by reference in its entirety), and the like as well as mixtures thereof.

Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of an organic carbonate and a glyme compound, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and viscosifier. For example, a composition comprising requisite amounts of the solid matrix forming monomer, salt, organic carbonate/glyme solvent and viscosifier can be applied to a substrate and then cured. Alternatively, the solid matrix forming monomer can be first cured and then dissolved in a suitable volatile solvent. Requisite amounts of the salt, organic carbonate/glyme solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature. Accordingly, the solid electrolyte of this invention does not include a separator as is typical of liquid electrolytes.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^{31}$, $CF_3SO_3^-$, and the like. Specific examples of suitable inorganic ion salts include $LiClO_4$, $LiI$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaI$, $NaSCN$, $KI$ and the like. The inorganic ion salt preferably contains at least one atom selected from the group consisting of Li, Na and K.

The term "organic carbonate" refers to hydrocarbyl carbonate compounds of no more than about 12 carbon atoms and which do not contain any hydroxyl groups. Preferably, the organic carbonate is a linear aliphatic carbonate and most preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl- 1,3-dioxolan-2-one; 4-methyl-5-ethyl-1,3-dioxolan-2-one; 4,5-diethyl-1,3-dioxolan-2-one; 4,4-diethyl-1 ,3-dioxolan-2-one; 1,3-dioxan-2-one; 4,4-dimethyl-1,3-dioxan-2-one; 5,5-dimethy-1-1, 3-dioxan-2-one; 5-methyl- 1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl- 1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety.

Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Viscosifiers are often components of the electrolyte and cathode.

The term "electrochemical cell" refers to a composite containing an anode, a cathode and an ion-conducting electrolyte interposed therebetween.

The "anode" refers to an electrode for the half-cell reaction of oxidation on discharge typically comprised of a compatible anodic material. Such compatible anodic materials are well known in the art and include, by way of example, lithium, lithium alloys such as alloys of lithium with aluminum, mercury, tin, zinc, and the like, and intercalation based anodes such as carbon, tungsten oxides and the like.

The "cathode" refers to the counter-electrode to the anode and is comprised of compatible cathodic materials, e.g., cathode-active insertion compounds. Such compatible cathodic materials are well known in the art and include cathode-active material such as, by way of example, manganese oxides, molybdenum oxides, vanadium oxides, sulfides of titanium, molybdenum and niobium, lithiated cobalt oxides, lithiated manganese oxides, lithiated nickel oxides, chromium oxides, copper oxides, and the like. The particular compatible cathodic material employed is not critical.

Among the cathode-active materials $V_6O_{13}$ is particularly preferred, and other preferred materials include $LiMnO_2$, $LiMn_2O_4$, $LiCoO_2$, $V_3O_8$, $LiNiO_2$, $Li_2Mn_2O_4$, $\omega$-$V_2O_5$ and $\epsilon$-$Cu_{0.2}V_2O_5$.

The cathode-active material is used in the form of a particulate having a mean diameter of about 1–90 $\mu$m, preferably about 2–30 $\mu$m, and more preferably about 4–15 $\mu$m.

The term "conducting polymer" refers to an organic polymer-containing material which is capable of electronic conduction. The polymer is characterized by a conjugated network of double bonds. The virgin polymer is rendered conducting by interaction with a dopant (oxidation or reduction). The polymer is reacted with an electron donor dopant or an electron acceptor dopant to modify its room temperature conductivity. The electron donor or acceptor is known in the art as n-type and p-type dopants, respectively. Polyacetylene and polyaniline are examples of organic polymers whose room temperature electrical conductivity is modified over several orders of magnitude above its insulator state by the incorporation of dopants (U.S. Pat. No. 4,222,093). Other examples of such polymers are polyquinoline, polyquinoxaline, poly(p-phenylene sulfite), poly(phenylquinoxaline), poly(p-phenylene), polypyrrole, and polyphthalocyaninesiloxane.

Electronically conducting polymers have a conductivity which has been modified with electron acceptor or donor dopants to be greater than the conductivity of the virgin state of the polymer. The electro-active organic polymeric material is fabricated from a virgin polymer, by modifying the polymer with electron donor dopants or electron acceptor dopants. An n-type electro-active organic polymer is obtained by reacting the virgin polymer with reducing or electron donor dopants. Electron donor dopants induce n-type conductivity in the polymer by donating electrons to the polymer and reducing the polymer to a polyanion and the dopant is oxidized to a charge neutralizing cation. Similarly, a p-type electro-active organic polymer is obtained by reacting the virgin polymer with oxidizing electron acceptor dopants. Electron acceptor dopants induce p-type conductivity in the polymer by oxidizing the polymer to a polycation and the dopant is reduced to a charge neutralizing anion.

Alternatively, the polymers can be oxidized or reduced to their conductive form using electrochemical techniques. In this method, also known as electrochemical doping, the polymer is immersed in a suitable electrolyte solution and used as one electrode of an electrochemical cell. Upon passing an electric current through the cell, the polymer is reduced or oxidized (depending upon the direction of current flow) and charge compensating cationic or anionic dopants from the supporting electrolyte are incorporated into the polymer. For both types of doping, the resulting electro-active polymer consists of a charged polymer backbone incorporating charge compensating ionic dopants. The charges of the polymer and the charge compensating dopants balance so that the electro-active polymer is electrically neutral. The oxidation or reduction proceeds by an electron transfer.

The desired value of the room temperature electrical conductivity of the dopant modified electro-active organic polymer can be adjusted by controlling the level of incorporation of the dopants into the virgin polymer. Alternatively, the desired value of the room temperature electrical conductivity of the dopant modified electro-active organic polymer is preselected by controlling the length of the reaction time between the virgin polymer and dopants.

As heretofore described, the dopant counter ion in oxidation or reduction plays no further role other than to provide electrical neutrality. In a preferred embodiment of the present invention, the dopant counter ion assists in solubilizing the conducting polymer in a readily available solvent at room temperature and, in fact, the dopant counter ion is selected to assist solubilization of the polymer in particular solvents. In the following, the solubilization mechanism will be described in terms of the solubilization of polyaniline by a functionalized protonic acid, but it is evident that other solubilizing dopants may be used in reduction or oxidation (n-type or p-type doping).

High molecular weight polyaniline is an example of an intractable material. Melt processing is not possible because the material decomposes before softening. While polyaniline may be solution-processed from strong acids, it was generally accepted in the field of conducting polymers that it is impossible to dope high molecular weight polyaniline to the conducting form in common non-polar or weakly polar organic solvents until Y. Cao et al., Synthetic Metals, 48 (1992) 91–97, described the use of functionalized protonic acids to dope polyaniline and simultaneously render the resulting polyaniline salt soluble in common organic solvents. The disclosure of the Cao et al. publication is incorporated herein by reference in its entirety.

Consider polyaniline which has been protonated by reaction with a functionalized protonic acid, for example, in an aqueous medium with pH <2–3. If the virgin polymer is represented by P and the functionalized protonic acid is $H^+M^-R$, where $H^+$ is a proton, $M^-$ is an anion and R is a solubilizing group, then the reaction with the polymer produces $HP^+M^-R$ which is equivalent, for our purposes, to oxidation of the polymer.

The term "protonated polyaniline salt" refers to the conducting polymer composition represented by $HP^+M^-R$.

The term "functionalized protonic acid" refers to an acid denoted $H^+M^-R$, where R is the functional group chosen to be compatible with a non-polar or weakly polar common organic solvent. An illustrative example is dodecylbenzenesulfonic acid (DBSA), wherein $M^-$ is $SO_3^-$ and R is $-\phi C_{12}H_{25}$. The long alkyl chain of DBSA leads to the solubilization of polyaniline in common solvents such as xylene, toluene, decalin, etc.

In general, $M^-$ is any compatible anion in a protonic acid and R is any organic solubilizing group, e.g., a hydrocarbyl or oxyhydrocarbyl group of from about 3 to about 50 carbon atoms.

The term "polymer composition" refers to the doped polymer (oxidized, reduced or protonated).

The term "solubilized conducting polymer" refers to the defined conducting polymer composition in solution in a compatible solvent. For example, protonated polyaniline salt in xylene solution.

It is evident that the dopant counter ion in oxidation or reduction of any virgin conducting polymer may be functionalized to contain a solubilizing group. In which event the solubilizing group may be selected to assist solubilization of the polymer in a particular non-polar or weakly polar common solvent, or any other solvent.

The terms "hydrocarbyl" and "oxyhydrocarbyl" refer to monovalent moieties composed of hydrogen and carbon, and hydrogen, carbon and oxygen, respectively.

In the practice of the method of the present invention, it is necessary to form a mixture comprising a cathode-active material in particulate form, a solubilized conducting polymer, and a solvent for the conducting polymer, as heretofore described, or the polymer may be solubilized by any method compatible with the objective of coating the cathode-active particles with conducting polymer. The cathode-active material, such as $V_6O_{13}$, is readily available in particulate form, or may be ground in a grinding machine (Attritor Model S-1, Union Process, Akron, Ohio). The solvent is then substantially removed from the mixture by any conventional means, preferably by spray drying. The need to remove the solvent emphasizes the preference for relatively volatile solvents, preferably those having a boiling point less than about 200° C., more preferably less than 100° C.

The product remaining after substantially all the solvent is removed from this mixture, is the cathode-active particulate coated with the conducting polymer composition. Preferably, the particles are uniformally coated and preferably, they are coated with a layer of conducting polymer composition of from about 0.1 μm to about 2 μm in average thickness. The product may be reground as heretofore described to obtain a powder suitable for forming the cathode paste.

EXAMPLE

An electrochemical cell using $V_6O_{13}$ as the cathode-active material may be made in the foregoing manner from a conducting polymer composition of polyaniline. This cell may be compared to a more conventional electrochemical cell in which the cathode is made from $V_6O_{13}$ mixed with carbon powder. Except for the use of coated $V_6O_{13}$ particles instead of carbon powder, both cells are substantially as described hereinafter and in U.S. patent application Serial Nos. 07/918,509, filed Jul. 22, 1992, and 08/049,212, filed Apr. 19, 1993, the disclosures of each of which is incorporated herein by reference in its entirety.

A cathode paste is prepared by combining the dry cathode-active particulate, coated with conducting polymer (e.g., $V_6O_{13}$ and polyaniline, about 55 weight percent) with electrolyte solvents (e.g., propylene carbonate and triglyme, 4:1, about 35 weight percent), and a solid polymeric matrix polymer precursor (e.g., polyethylene oxide, polyethylene glycol diacrylate and ethoxylated trimethylol-propane triacrylate, 1:8.5:1.5, about 10 weight percent). All weight percents are based on the total weight of the paste. This combination of ingredients is thoroughly mixed at moderate temperature (e.g., less than about 90° C.), to form the cathode paste.

The cathode paste noted above can be placed onto the adhesion layer of a current collector by extrusion at a temperature of from about 45° to about 48° C. A Mylar cover sheet can be placed over the paste and the paste can be spread to a thickness of about 90 microns ($\mu$m) with a conventional plate and roller system and can be cured by continuously passing the sheet through an electron beam apparatus (Electro-curtain, Energy Science Inc., Woburn, Mass.) at a voltage of about 175 kV and a current of about 1.0 mA and at a rate of about 1 cm/sec. After curing, the Mylar sheet can be removed to provide for a solid cathode laminated to an aluminum current collector.

56 grams of propylene carbonate, 14 grams of triglyme, and 17 grams of urethane acrylate (Photomer 6140, available from Harckos, Manchester, U.K.) can be combined at room temperature until homogeneous. The resulting solution can be passed through a column of 4A sodiated molecular sieves to remove water and then can be mixed at room temperature until homogeneous.

At this point, 3 grams of polyethylene oxide having a number average molecular weight of about 600,000 available as Polyox WSR-205 from Union Carbide Chemicals and Plastics, Danbury, Conn., can be added to the solution and then dispersed while stirring with a magnetic stirrer over a period of about 120 minutes. After dispersion, the solution can be heated to between 60° C. and 65° C. with stirring until the viscosifying agent dissolves. The solution can be cooled to a temperature of between 45° and 48° C., a thermocouple can be placed at the edge of the vortex created by the magnetic stirrer to monitor solution temperature, and then 10 grams of $LiPF_6$ can be added to the solution over a 120 minute period while thoroughly mixing to ensure a substantially uniform temperature profile throughout the solution. Cooling can be applied as necessary to maintain the temperature of the solution between 45° and 48° C.

In one embodiment, the polyethylene oxide can be added to the solution via a mini-sieve such as a 25 mesh mini-sieve commercially available as Order No. 57333-965 from VWR Scientific, San Francisco, Calif.

The resulting solution should contain the following:

| Component | Amount | Weight Percent[a] |
|---|---|---|
| Propylene Carbonate | 56 g | 56 |
| Triglyme | 14 g | 14 |
| Urethane Acrylate | 17 g | 17 |
| $LiPF_6$ | 10 g | 10 |
| PEO | 3 g | 3 |
| Total | 100 g | 100 |

[a] = weight percent based on the total weight of the electrolyte solution (100 g)

Optionally, solutions which can be produced as above and which contain the prepolymer, the polyethylene oxide viscosifier, the electrolyte solvent and the $LiPF_6$ salt can be filtered to remove any solid particles or gels remaining in the solution. One suitable filter device is a sintered stainless steel screen having a pore size between 1 and 50 $\mu$m at 100% efficiency.

Alternatively, the electrolyte solution can be prepared in the following manner. Specifically, in this example, the mixing procedure can be conducted using the following weight percent of components:

| | |
|---|---|
| Propylene Carbonate | 52 weight percent |
| Triglyme | 13 weight percent |
| Urethane Acrylate[b] | 20 weight percent |
| $LiPF_6$ | 10 weight percent |
| PEO[c] | 5 weight percent |

[b](Photomer 6140, available from Harckos, Manchester, U.K.)
[c]polyethylene oxide having a number average molecular weight of about 600,000 (available as Polyox WSR-205 from Union Carbide Chemicals and Plastics, Danbury, CT.)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, Calif.) and then proceed to step 4.

2. Dry the propylene carbonate and triglyme over sodiated 4Å molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide through a 25 mesh mini-sieve commercially available as Order No. 57333-965 from VWR Scientific, San Francisco, Calif. While stirring at 300 rpm, add the dried and pre-sifted polyethylene oxide slowing to the solution. The polyethylene oxide should be sifted into the center of the vortex formed by the stirring means over a 30 minute period. Addition of the polyethylene oxide should be dispersive and, during addition, the temperature should be maintained at room temperature (<30° C.).

5. After final addition of the polyethylene oxide, stir an additional 30 minutes to ensure that the viscosifier is substantially dispersed.

6. Heat the mixture to 68° C. to 75° C. and stir until the viscosifier has melted and the solution has become transparent to light yellow in color. Optionally, in this step, the mixture is heated to 65° C. to 68° C.

7. Cool the solution produced in step 6 and when the temperature of the solution reaches 40° C., add the $LiPF_6$ salt very slowly making sure that the maximum temperature does not exceed 55° C.

8. After the final addition of the $LiPF_6$ salt, stir for an additional 30 minutes, degas, and let sit overnight and cool.

9. Filter the solution through a sintered stainless steel screen having a pore size between 1 and 50 $\mu$m at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 $\mu$m onto the surface of the cathode sheet prepared as above (on the side opposite that of the current collector) but without the Mylar covering. The electrolyte should be cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite can be recovered which contains a solid electrolyte laminated to a solid cathode.

The anode can comprise a sheet of lithium foil (about 51–76 μm thick) which is commercially available from FMC Corporation Lithium Division, Bessemer City, N.C.

A sheet comprising a solid battery can be prepared by laminating the lithium foil anode to the surface of the electrolyte in the sheet produced in step C above. Lamination can be accomplished by minimal pressure.

It was found that a conducting polymer cell made substantially as-described behaves as a secondary electrochemical cell capable of many charge-discharge cycles with satisfactory charge capacity.

Figure 2:
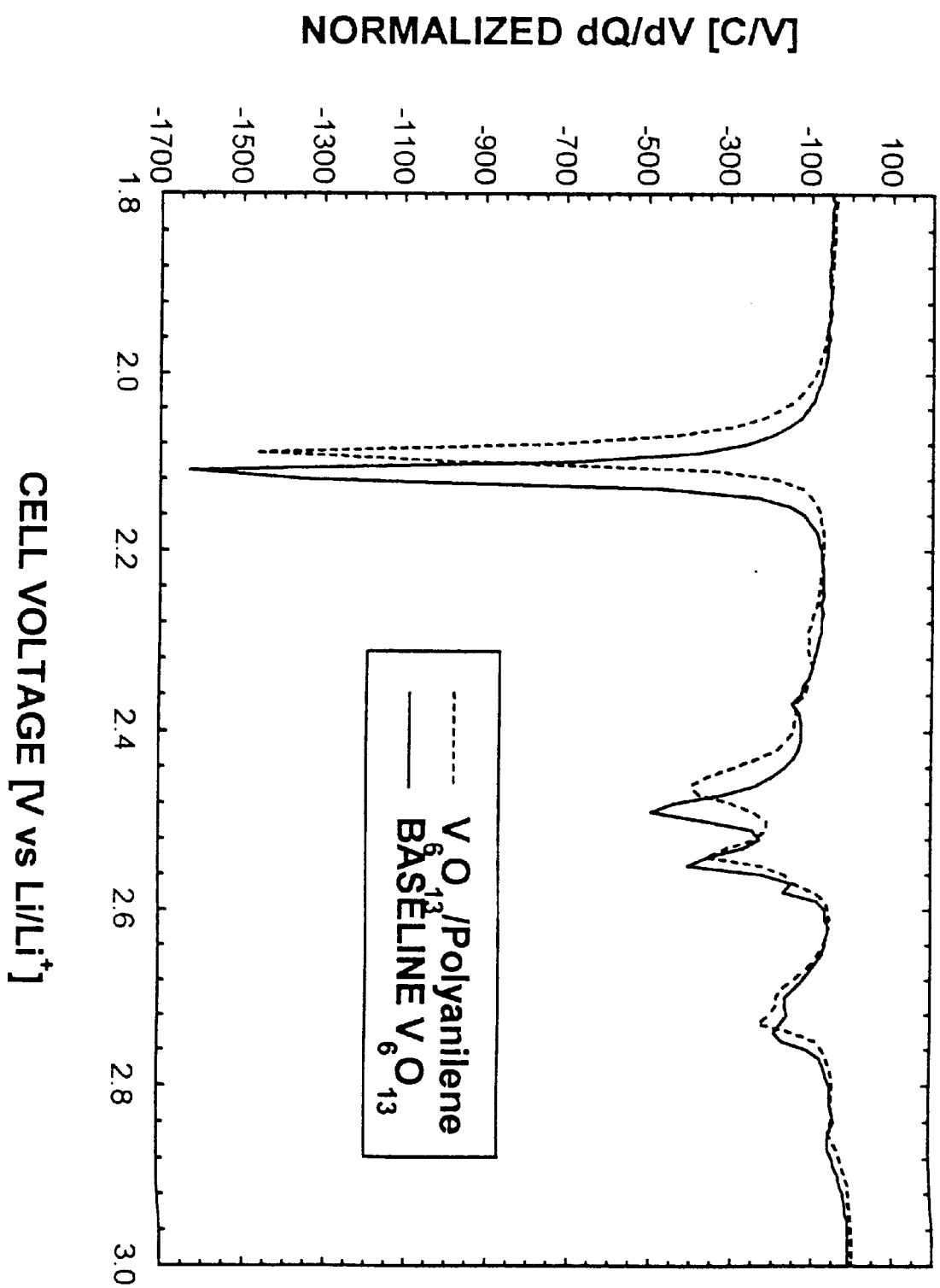
FIG. 2 shows the change in the charge capacity of the cell with the cell voltage, as the cell is discharged; comparing two cells, one containing a typical cathode, the other containing a cathode of this invention. Note that the voltage plateaus of FIG. 1 correspond to the dips in FIG. 2.

FIG. 1 plots a voltage of a polyaniline-containing cell of the present invention versus its capacity in milliampere hours in the course of a typical discharge of the cell. It is noteworthy that the voltage plateau at 2.08 volts and the other voltage characteristics of the $V_6O_{13}$/polyaniline cell are at least as satisfactory as those of the $V_6O_{13}$/carbon cell. FIG. 2 offers a direct comparison of the differential cell capacity versus voltage for the two types of cells. The dips in FIG. 2 correspond to the plateaus in FIG. 1 and demonstrate that the conducting polymer cell of the present invention not only mimics the good performance of the carbon cell, but the slight shift in voltage shown in FIG. 2 is believed to be due to the lower resistivity in the conducting polymer cell, which is a highly satisfactory result.

While the invention has been described in terms of various preferred embodiments, the skilled artisan will appreciate the various modifications, substitutions, omissions and changes which may be made without departing from the spirit hereof. The descriptions of the subject matter in this disclosure are illustrative of the invention and are not intended to be construed as limitations upon the scope of the invention.

What is claimed is:

1. A particulate material comprising a cathode-active material coated with a conducting polymer composition.

2. A cathode comprising particles of a cathode-active material coated with a conducting polymer composition.

3. A cathode according to claim 2 wherein said conducting polymer composition comprises a major amount of a polymer selected from the group consisting of: polyaniline, polyacetylene, polyquinoline, polyquinoxaline, poly(p-phenylene sulfite), poly)(phenylquinoxaline), poly(p-phenylene), polypyrrole, and polyphthalocyaninesiloxane, and an effective amount of dopant to render said polymer conducting.

4. A cathode according to claim 2 wherein said conducting polymer composition comprises a major amount of polyaniline and an effective amount of dopant to render said polymer conducting.

5. A cathode according to claim 4 wherein said conducting polymer composition comprises a protonated polyaniline salt.

6. A particulate according to claim 1 wherein said cathode-active material is an intercalation compound.

7. A particulate according to claim 1 wherein said cathode-active material is a lithium intercalation compound.

8. A particulate according to claim 1 wherein said cathode-active material is a chalcogenide.

9. A particulate according to claim 1 wherein said cathode-active material is an oxide of a metal selected from the group consisting of V, Mn, Co, Ni, Cr, Ti, Mo, and Nb.

10. A particulate according to claim 1 wherein said cathode-active material is vanadium oxide.

11. A particulate according to claim 1 wherein said cathode-active material is $V_6O_{13}$.

12. A particulate according to claim 1 wherein said cathode-active material is selected from the group consisting of $LiV_3O_8$, $V_6O_{13}$, $LiMn_2O_4$, $LiCoO_2$, $LiNiO_2$, $\omega$-$V_2O_5$ and $\epsilon$-$Cu_{0.2}V_2O_5$.

13. A cathode according to claim 2 wherein said cathode-active material is an intercalation compound.

14. A cathode according to claim 2 wherein said cathode-active material is selected from the group consisting of $LiV_3O_8$, $V_6O_{13}$, $LiMn_2O_4$, $LiCoO_2$, $LiNiO_2$, $\omega$-$V_2O_5$ and $\epsilon$-$CU_{0.2}V_2O_5$.

15. A cathode according to claim 3 wherein said cathode-active material is an intercalation compound.

16. A cathode according to claim 3 wherein said cathode-active material is selected from the group consisting of $LiV_3O_8$, $V_{613}$, $LiMn_2O_4$, $LiCoO_2$, $LiNiO_2$, $\omega$-$V_2O_5$ and $\epsilon$-$CU_{0.2}V_2O_5$.

17. A cathode according to claim 4 wherein said cathode-active material is an intercalation compound.

18. A cathode according to claim 4 wherein said cathode-active material is selected from the group consisting of $LiV_3O_8$, $V_6O_{13}$, $LiMn_2O_4$, $LiCoO_2$, $LiNiO_2$, $\omega$-$V_2O_5$ and $\epsilon$-$Cu_{0.2}$ $V_2O_5$.

19. A cathode according to claim 5 wherein said cathode-active material is an intercalation compound.

20. A cathode according to claim 5 wherein said cathode-active material is selected from the group consisting of $LiV_3O_8$, $V_6O_{13}$, $LiMn_2O_4$, $LiCoO_2$, $LiNiO_2$, $\omega$-$V_2O_5$ and $\epsilon$-$Cu_{0.2}V_2O_5$.

* * * * *